US008791861B2

(12) United States Patent
Garcia et al.

(10) Patent No.: US 8,791,861 B2
(45) Date of Patent: Jul. 29, 2014

(54) DETERMINATION OF STATE VECTOR, TIMING, AND NAVIGATION QUALITY METRICS FROM RECEPTION OF ADS-B TRANSMISSIONS

(75) Inventors: Michael A. Garcia, Herndon, VA (US); Robert Mueller, Herndon, VA (US); John W. Lambert, Herndon, VA (US); John M. Dolan, Herndon, VA (US)

(73) Assignee: Exelis, Inc., McLean, VA (US)

( * ) Notice: Subject to any disclaimer, the term of this patent is extended or adjusted under 35 U.S.C. 154(b) by 533 days.

(21) Appl. No.: 13/087,809

(22) Filed: Apr. 15, 2011

(65) Prior Publication Data

US 2012/0262339 A1  Oct. 18, 2012

(51) Int. Cl.
*G01S 5/14* (2006.01)

(52) U.S. Cl.
USPC .......................................... 342/464; 342/387

(58) Field of Classification Search
CPC ..... G01S 5/14; G01S 13/781; G01S 13/9303; G01S 13/91
USPC .......... 342/29–32, 36–40, 385–387, 450–465
See application file for complete search history.

(56) References Cited

U.S. PATENT DOCUMENTS

| 4,193,073 | A | 3/1980 | Kohnen |
| 5,600,706 | A | 2/1997 | Dunn et al. |
| 7,132,982 | B2 | 11/2006 | Smith et al. |
| 7,570,195 | B2 | 8/2009 | Bartolini et al. |
| 7,777,675 | B2 | 8/2010 | Smith et al. |
| 7,983,185 | B2 * | 7/2011 | Rhoads et al. ............... 370/252 |
| 2010/0202300 | A1 | 8/2010 | Rhoads et al. |
| 2010/0260150 | A1 | 10/2010 | Aryan et al. |
| 2011/0163908 | A1 * | 7/2011 | Andersson et al. ............ 342/36 |
| 2012/0188057 | A1 | 7/2012 | Green et al. |
| 2012/0262339 | A1 | 10/2012 | Garcia et al. |

FOREIGN PATENT DOCUMENTS

EP  1912077 A2  4/2008

OTHER PUBLICATIONS

Extended Search Report in counterpart European Application No. 12163876.1, mailed Jul. 2, 2012.
Smith A. et al., "System Wide ADS-B Back Up and Validation," Internet Citation, [online] May 1, 2006, pp. 1-24, XP002517156, retrieved from the Internet:URL:http://acast.grc.nasa.gov/icnsconf/ 2006 [retrieved on May 1, 2006].

(Continued)

*Primary Examiner* — Cassie Galt
(74) *Attorney, Agent, or Firm* — Edell, Shapiro & Finnan, LLC

(57) ABSTRACT

A technique for determining the position of a mobile device includes receiving messages from respective mobile reference devices. Each of the messages is broadcast beginning at one of several predetermined message start opportunity (MSO) times that have known timings relative to a reference time. Each of the messages contains a MSO value identifying the MSO time at which transmission of the message started. The MSO value is used to determine the time of transmission of each of the messages received at the mobile device, and the position of the mobile device is determined via multi-lateration. According to another approach, the mobile device receives a set of ADS-B messages from a respective set of mobile reference devices. The time of transmission of each of the ADS-B messages is supplied in the ADS-B message itself or in a subsequent message and used to determine the position of the mobile device.

20 Claims, 10 Drawing Sheets

(56) References Cited

OTHER PUBLICATIONS

Harman W. et al., "Techniques for Improved Reception of 1090 MHz ADS-B Signals," Digital Avionics Systems Conference, 1998, Proceedings, 17th DASC. The AIAA/IEEE/SAE Bellevue, WA, USA Oct. 31-Nov. 7, 1998, New York, NY, USA IEEE, US, vol. 2, Oct. 31, 1998, pp. G25/1-G25/9, XP010318180, DOI: 10.1109/DASC.1998.739844, ISBN: 978-0-7803-5086-1.

* cited by examiner

US 8,791,861 B2

DETERMINATION OF STATE VECTOR, TIMING, AND NAVIGATION QUALITY METRICS FROM RECEPTION OF ADS-B TRANSMISSIONS

BACKGROUND

Global Navigation Satellite Systems (GNSS) such as the U.S. NAVSTAR Global Positioning System (GPS), the European Galileo positioning system, and the Russian GLONASS system are increasingly relied upon to precisely determine the geographic position of receiver equipment and to establish timing according to a reliable, accurate reference. Certain aspects of air traffic control systems have evolved to depend more on GPS navigation as conventional approaches, such as those relying on secondary surveillance radar (SSR), VHF omnidirectional range (VOR), and distance measuring equipment (DME), have seen a diminished role. For example, aircraft equipped for Automatic Dependent Surveillance-Broadcast (ADS-B) surveillance rely primarily on GPS signals to determine their position and then report their position to other aircraft and to ground radio stations. Another example of dependence on the GPS system is found in the financial industry, where institutions rely on the GPS system to maintain the accurate timing required for financial transactions. A wide range of GPS-equipped consumer products such as mobile phones, portable computers, and navigation devices have become ubiquitous and depend exclusively on the GPS system, or comparable GNSS satellite networks, for timing and navigation.

For a variety of reasons, however, GPS service is not completely reliable. Locations surrounded by obstructions (e.g., mountainous regions and "urban canyons") may receive GPS signals only intermittently or not at all. GPS satellite equipment can potentially suffer outages, failure, or damage, and atmospheric conditions can potentially impact signal reception. In aviation, the ADS-B surveillance system is dependent on GPS for accurate, efficient, and continuous navigation and surveillance. Reliance on GPS or other satellite systems can result in common mode failures for GNSS receivers and the ADS-B surveillance system without sufficient backup. Ground-based radar systems can provide surveillance but not navigation to aircraft as they exist today. Other aviation position derivation devices such as VOR/DME have insufficient accuracy and coverage to support reliable and efficient aircraft separation.

Thus, it would be desirable to have a reliable alternative to GPS that can provide accurate navigation and timing over a wide geographic area and which is seamless with GPS to the end user.

SUMMARY

Described herein is a technique for determining the position of a mobile device, such as a device on an airborne, maritime, or ground-based platform, involving receiving at the mobile device a plurality of messages from a respective plurality of mobile reference devices, each of the messages being broadcast beginning at one of a plurality of message start opportunity (MSO) times having known timings relative to a reference time, wherein each of the messages contains position information for the mobile reference device transmitting the message and a MSO value indicating the MSO time at which transmission of the message started. The mobile device determines the time of reception of each of the messages and uses the received MSO value to determine the time of transmission of each of the messages such that the mobile device can compute the propagation time of each message or, equivalently, the range to each of the mobile reference devices. Multi-lateration can then be performed by the mobile device using the position information for the mobile reference devices and the signal propagation times (or ranges) to determine a navigation solution for the mobile device.

According to one implementation, the messages are Automatic Dependent Surveillance-Broadcast (ADS-B) transmissions from airborne aircraft or other mobile platforms, where the messages contain position information (e.g., latitude, longitude, and altitude) for the transmitting aircraft and include a field that indicates the MSO at which transmission of the message began and from which the time of transmission can be determined at the receiving mobile device. For example, such time-slotted ADS-B messages are employed within the Universal Access Transceiver (UAT) protocol.

Another approach for determining the position of a mobile device involves receiving at a mobile device a plurality of ADS-B messages from a respective plurality of airborne aircraft or other mobile platform. The mobile device determines the time of reception of each of the received ADS-B messages and determines a time of transmission of each of the ADS-B messages from information contained in a field of each of the ADS-B messages or within a field of respective subsequent messages. The ADS-B messages (such as a modified or re-purposed 1090 Extended Squitter) can contain position information for the transmitting aircraft, and the position of the mobile device can then be determined via multi-lateration based on the time of transmission and the time of reception of the ADS-B messages and the positions of the transmitting aircraft.

The aforementioned messages can also be used to synchronize a local clock of a mobile or stationary platform with the timing of a reference device. According to one approach, an ADS-B message transmitted from an airborne aircraft is received at an SBS receiver co-located with the local clock. The receiver determines the time of reception of the ADS-B message, and the time of transmission of the ADS-B message is determined from information contained in the ADS-B message or information contained in a subsequent message. The local clock is then synchronized with the timing of the transmitting aircraft based on the time of transmission and time of reception of the ADS-B message. This technique can be used, for example, to synchronize the clocks of a financial institution to a precise standard when GPS is temporarily unavailable.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Described herein are techniques for determining position and timing at a receiver that receives broadcast signals from one or more mobile source transmitters that reliably know their own position and timing. According to one approach, existing and slightly modified Automatic Dependent Surveillance-Broadcast (ADS-B) transmissions, which conventionally support aviation, can be employed to provide navigation and timing solutions to airborne, maritime, and ground-based platforms.

The Surveillance and Broadcast Services (SBS) system supports air traffic control and navigation and is designed to provide a variety of services to ADS-B equipped aircraft. In the National Airspace System (NAS), there are two applicable ADS-B link technologies: 1090 Extended Squitter (1090ES), which is an extension of Mode-S technology in which 1090ES avionics periodically broadcast messages at 1090 MHz that provide their identity (24-Bit Address), target state vector (position, velocity), and other aircraft status information; and Universal Access Transceiver (UAT), a newer technology in which UAT avionics periodically broadcast messages at 978 MHz that provide their identity, target state vector, and other status information. 1090ES is primarily geared toward high-altitude commercial aircraft and is used worldwide, while UAT is marketed toward general aviation (GA) aircraft that tend to fly at lower altitudes than commercial aircraft.

Figure 1:
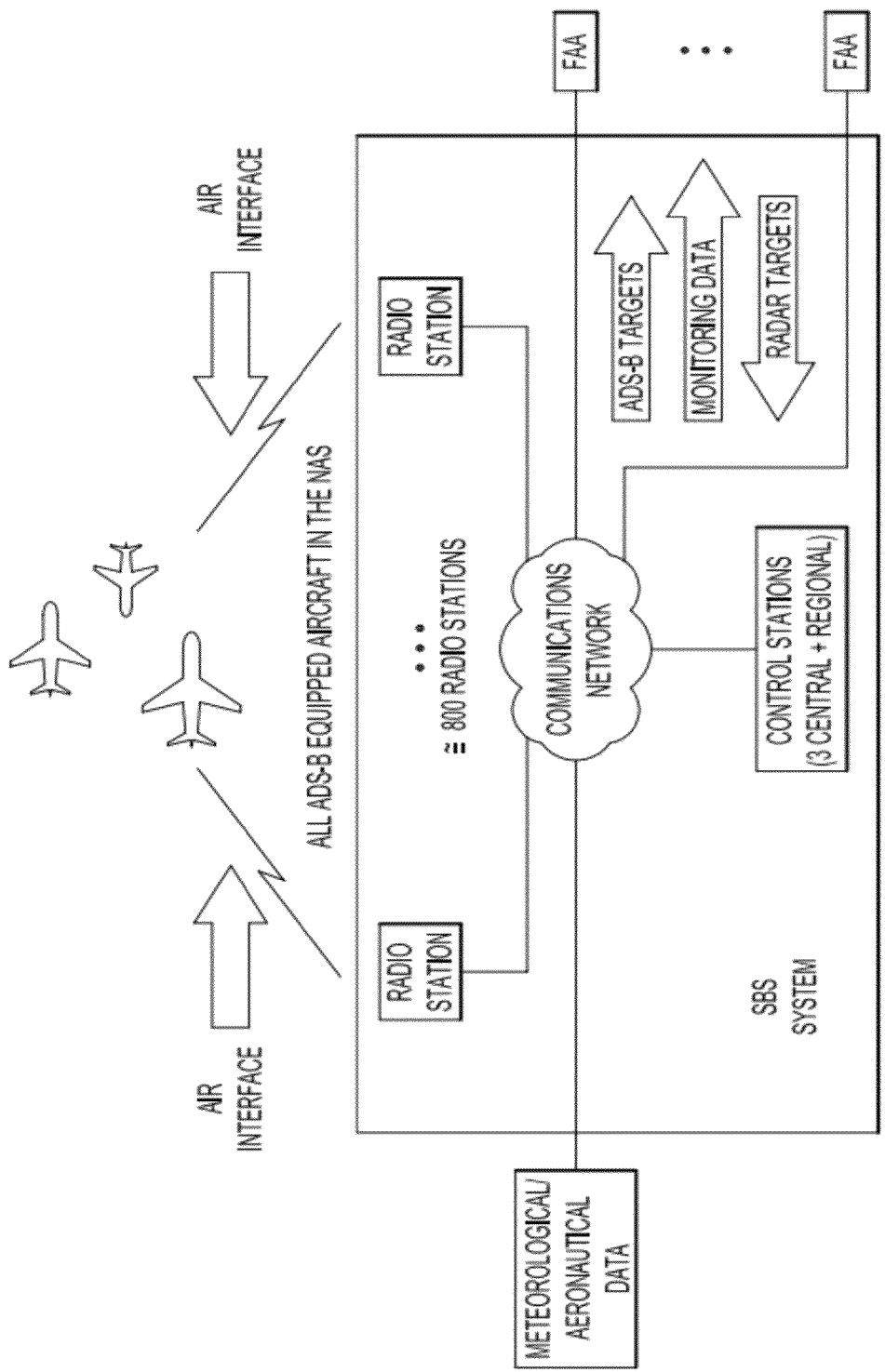
FIG. 1 is a top-level block diagram of the Surveillance and Broadcast Services (SBS) system in the context of the systems with which it interfaces.

FIG. 1 illustrates the SBS system in the context of the systems with which it interfaces. The SBS system in the U.S. currently includes approximately 800 ground radio stations that provide both uplink and downlink coverage over an air interface (wireless) to all ADS-B equipped aircraft in the national airspace. SBS ground radio stations (also referred to herein as simply "ground stations") can be positioned on telecommunication towers or the like, for example. A number of central and regional control stations are responsible for processing the following: ADS-B reports from FAA service delivery points (SDP) that supply ADS-B target reports; radar/sensor reports from FAA SDPs that supply target data from radar and other sensors; meteorological/aeronautical data supplied by a meteorological and aeronautical data source; and other data that enables the FAA to independently monitor the status of services providers via the SBS system. The SBS system further includes a communications network that provides the connectivity between all data sources (target, meteorological, and aeronautical), the data processing control stations, and the end user.

Figure 2:
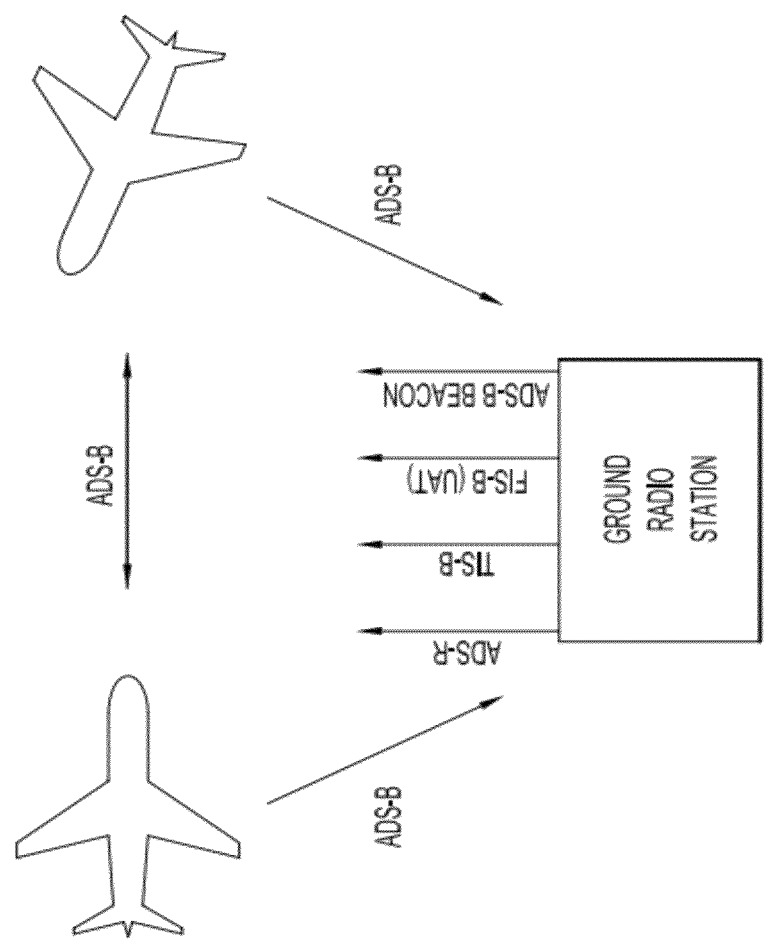
FIG. 2 is a diagram conceptually illustrating data flows between an SBS ground radio station and ADS-B equipped aircraft.

FIG. 2 provides a general overview of the types of messages broadcast in the SBS system. ADS-B service uses transmissions from ADS-B equipped aircraft to provide surveillance information to ground systems for air traffic control, and to other like-equipped aircraft for use in aircraft situational awareness. FIG. 2 illustrates that ADS-B messages broadcast by aircraft are received by other aircraft (air-to-air crosslinks) as well as by SBS ground stations (air-to-ground). ADS-B IN equipped aircraft are capable of transmitting and receiving ADS-B transmissions to and from other aircraft equipped with the same link technology (i.e., UAT-equipped aircraft can communicate with each other and 1090ES-equipped aircraft can communicate with each other).

Conventionally, aircraft determine their position in the context of the World Geodetic System (WGS) 84 model of the Earth (e.g., latitude, longitude, and altitude) using GPS or other sources such an on-board internal navigation systems (INS). The aircraft's state vector is encoded into ADS-B messages for broadcast to other aircraft and ground stations. In the case of a 1090ES link, the ADS-B transmission is actually a series of separate messages (e.g., a position message, a velocity message, etc.). With UAT, the ADS-B message can be a single packet with multiple fields containing the required state vector information.

These ADS-B messages provide applications on board the aircraft with position information about aircraft within range of the radio transmissions, which support aircraft surveillance and separation assurance applications that may directly provide flight crews with surveillance information as well as surveillance-based guidance and alerts. The ground stations of the SBS system also receive ADS-B messages broadcast by aircraft, and relay the aircraft position information to ground control stations that process the information, perform validity checks, and provide a low-latency feed of surveillance information to designated FAA SDPs for use in separation assurance and other air traffic control services. As described in greater detail below, beacon-like ADS-B messages can also be transmitted by platforms other than aircraft, such as ground-based obstacles, to alert aircraft.

Referring again to FIG. 2, the ground stations of the SBS system also broadcast uplink messages to in-range aircraft. The Automatic Dependent Surveillance-Rebroadcast (ADS-R) message is essentially a retransmission or relay of ADS-B information transmitted by an aircraft using one link technology to nearby aircraft using an incompatible link technology. For example, when first and second aircraft respectively using UAT and 1090ES links are in the same vicinity, an SBS ground station receiving a UAT ADS-B message from the first aircraft can rebroadcast the contents of that message in a 1090ES-compatible ADS-R message that can be received by a second aircraft (and vice versa) to allow the aircraft to receive each other's position information.

Ground stations also transmit Traffic Information Service-Broadcast (TIS-B) messages that provide ADS-B equipped aircraft with surveillance information for aircraft that are not ADS-B equipped from sources such as radar, ASDE-X, and multi-lateration systems.

Ground stations can also be configured to transmit a "beacon" ADS-B message, which is a type of ADS-B message designed to alert aircraft of a ground-based obstacle or the like.

Another uplink message broadcast by SBS ground stations to aircraft employing a UAT link is the Flight Information Service-Broadcast (FIS-B) message, which is used to convey general information such as meteorological, aeronautical data, and notice to airmen (NoTAMS) to provide timely information of regional weather and aviation system changes that might impact flight.

Figure 3:
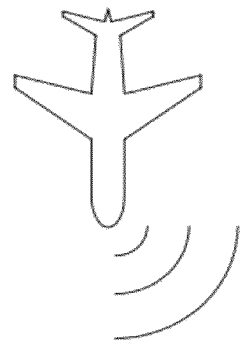
FIG. 3 is a diagram conceptually illustrating reception of air-to-air crosslink messages from a plurality of broadcasting aircraft by a receiving aircraft to support position determination.
Figure 3:
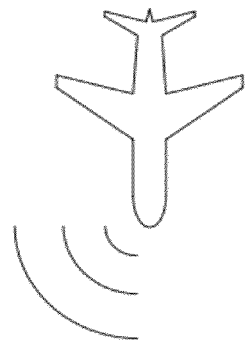
Figure 3:
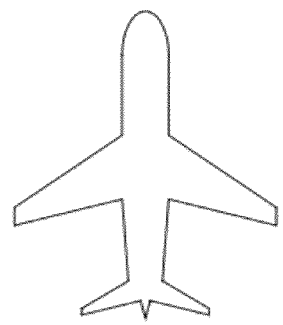
Figure 3:
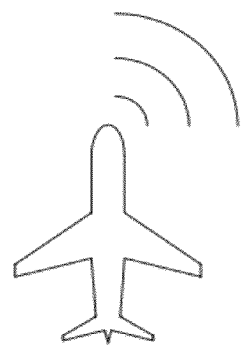
Figure 3:
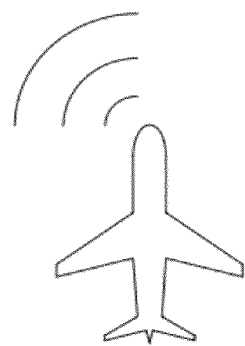

Within the UAT link protocol, to avoid contention among neighboring aircraft, the ADS-B messages are broadcast within a synchronized, time-segmented framework in which specific aircraft broadcast messages beginning at certain discrete points in time called Message Start Opportunities (MSOs). Each ADS-B message includes the transmitting aircraft's latitude, longitude, altitude, and an MSO value from which the time of transmission can be determined. According to one aspect of the invention, ADS-B messages transmitted from mobile platforms such as airborne aircraft can be used to provide navigation solutions to aircraft and other mobile platforms. As shown conceptually in FIG. 3, an aircraft or other platform equipped with an ADS-B transceiver employs air-to-air crosslink ADS-B messages received from a plurality of aircraft. Since the UAT and 1090ES protocols differ significantly, different implementations can be employed for determining position using existing ADS-B and slightly modified ADS-B message sets from aircraft or other ADS-B equipped mobile platforms. Aircraft SBS positioning system (SPS) enabled avionics receive these message sets and form state vector navigation solutions based on multi-lateration algorithms (similar to those used with GPS) and Kalman filtering or the like. Accuracy metrics of the navigation solution (e.g., navigation integrity category (NIC), navigation accuracy category (NAC), and source integrity level (SIL)) can also be computed. Optionally, these accuracy metrics can be used to determine whether the navigation solution determined from the uplinked messages has a greater or lesser accuracy than the current GPS navigation solution, and the more accurate navigation solution can be retained. SPS avionics feed the selected navigation solution back to the aircraft data bus to be broadcast via an ADS-B message, which can be received by ground stations and other aircraft to maintain surveillance on the ground and in the air.

Figure 4:
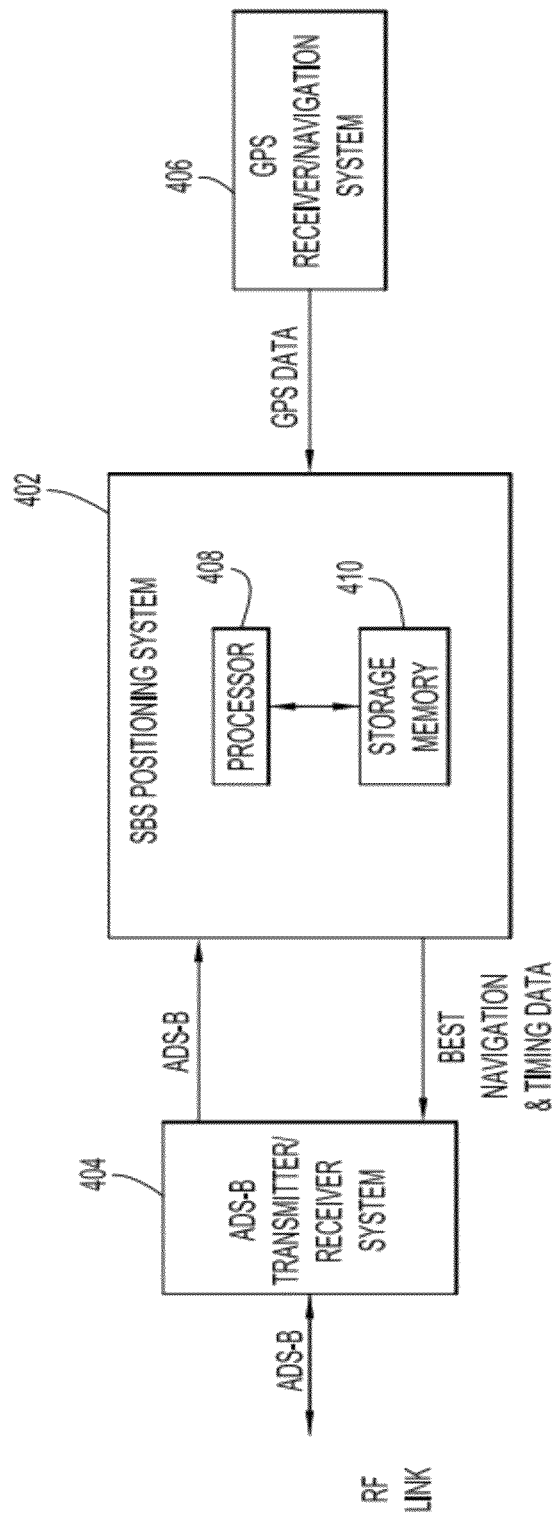
FIG. 4 is a block diagram of an SBS positioning system, coupled to an ADS-B transmitter/receiver system and a GPS receiver/navigation system, for determining position.

FIG. 4 is a block diagram of an SBS positioning system (SPS) 402 capable of determining its own position from air-to-air crosslink ADS-B messages received from a set ADS-B equipped mobile devices (e.g., airborne aircraft). SBS positioning system 402 is coupled to an ADS-B transmitter/receiver (transceiver) system 404 and a GPS receiver/navigation system 406. SBS positioning system 402 includes a processing capability represented in FIG. 4 by processor module 408. Processor 408 is capable of executing program instructions (i.e., software) for carrying out various operations and tasks. For example, processor 408 can interpret data and commands received from the ABS-B transmitter/receiver system 404 and from GPS receiver/navigation system 406, perform computations, and cause information to be stored. Processor 408 is, for example, a microprocessor, a microcontroller, a digital signal processor, etc.

A storage capability of SBS positioning system 410 is represented by storage/memory module 410, which can store information relating to the messages and message information supplied by ADS-B transmitter/receiver system 404 and GPS receiver system 406 as well as results of computations and other data or information. Storage/memory module 410 can also store program instructions (i.e., software) to be executed by processor 408 to carry out operations. Thus, the operations and methodologies described herein can be carried out by executing instructions stored on a computer readable medium (i.e., software) on a processor or processors located within SBS positioning system 402. As used herein, the term "computer readable medium" refers to "non-transitory" or tangible media (e.g., memory or storage devices). Storage/memory module 410 is a non-transitory processor-readable or computer-readable memory that stores or is encoded with instructions that, when executed by processor 408, cause processor 408 to perform the functions described herein. While FIG. 4 shows a processing environment comprising a data processor 408 that executes software stored in storage/memory module 410, an alternative processing environment is a fixed data processing element, such as an application specific integrated circuit (ASIC) that is configured, through fixed hardware logic, to perform the functions of the logic. Yet another possible data processing environment is one involving one or more field programmable logic devices, firmware, or a combination of fixed processing elements, firmware, and/or programmable logic devices.

In FIG. 4, the SBS positioning system 402 is shown conceptually as a separate system from the ADS-B transmitter/receiver system 404. Optionally, the capabilities represented by the SBS positioning system 402 can be integrated into the ADS-B IN avionics (i.e., the ADS-B transmitter/receiver system 404 in FIG. 4), for example as a software upgrade or application.

Figure 5:
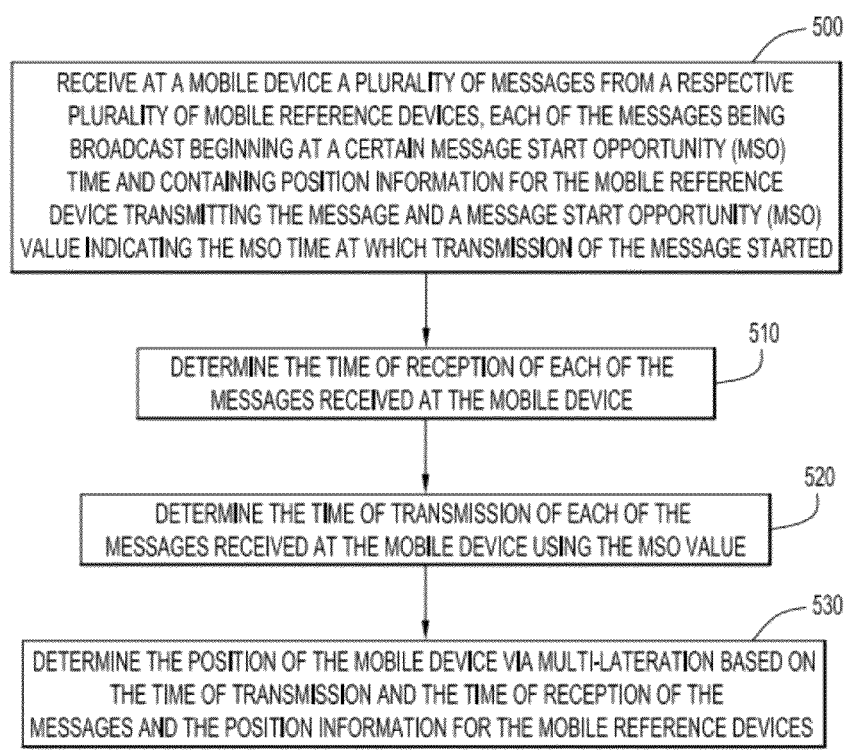
FIG. 5 is a functional flow diagram of operations performed by a mobile device to determine its position from messages received from a plurality of mobile ADS-B broadcasting devices.

The flow diagram shown in FIG. 5 summarizes a technique employed to determine the position of an aircraft or another mobile platform or device using messages in a time division multiplexing scheme such as that of the UAT protocol, where messages received from a set of mobile reference devices, such as ADS-B equipped aircraft, include reliable transmitter position information and a MSO value.

In operation 500, a mobile device receives a plurality of messages from a respective plurality of mobile reference devices. As used herein, a mobile device is any device capable of transmitting or receiving position messages, including airborne avionics systems, maritime navigation systems, navigation systems mounted on ground vehicles, and portable navigation devices such and handheld or body-mounted devices. Each of the messages is broadcast beginning at a certain MSO time that has a known timing relative to a reference time. Each of the messages also contains position information about the broadcasting reference device.

For example, in the UAT protocol targeted to general aviation aircraft, ADS-B messages are broadcast from aircraft to convey information such as the aircraft's current position. By processing existing ADS-B messages from a set of transmitting aircraft, a receiving aircraft or other UAT-equipped platform can determine its own navigation solution (position). In the example shown in FIG. 4, the onboard ADS-B transceiver system 404 receives the ADS-B messages and supplies them to SBS positioning system 402 for position determination processing.

ADS-B messages that are received by UAT-equipped aircraft are transmitted with specific rules. Each aircraft is required to transmit its ADS-B messages beginning at certain, periodic discrete instants called Message Start Opportunities (MSOs) with a certain precision. In particular, the aircraft are synchronized to Coordinated Universal Time (UTC), and signaling is scheduled according to one-second time frames.

Figure 6:
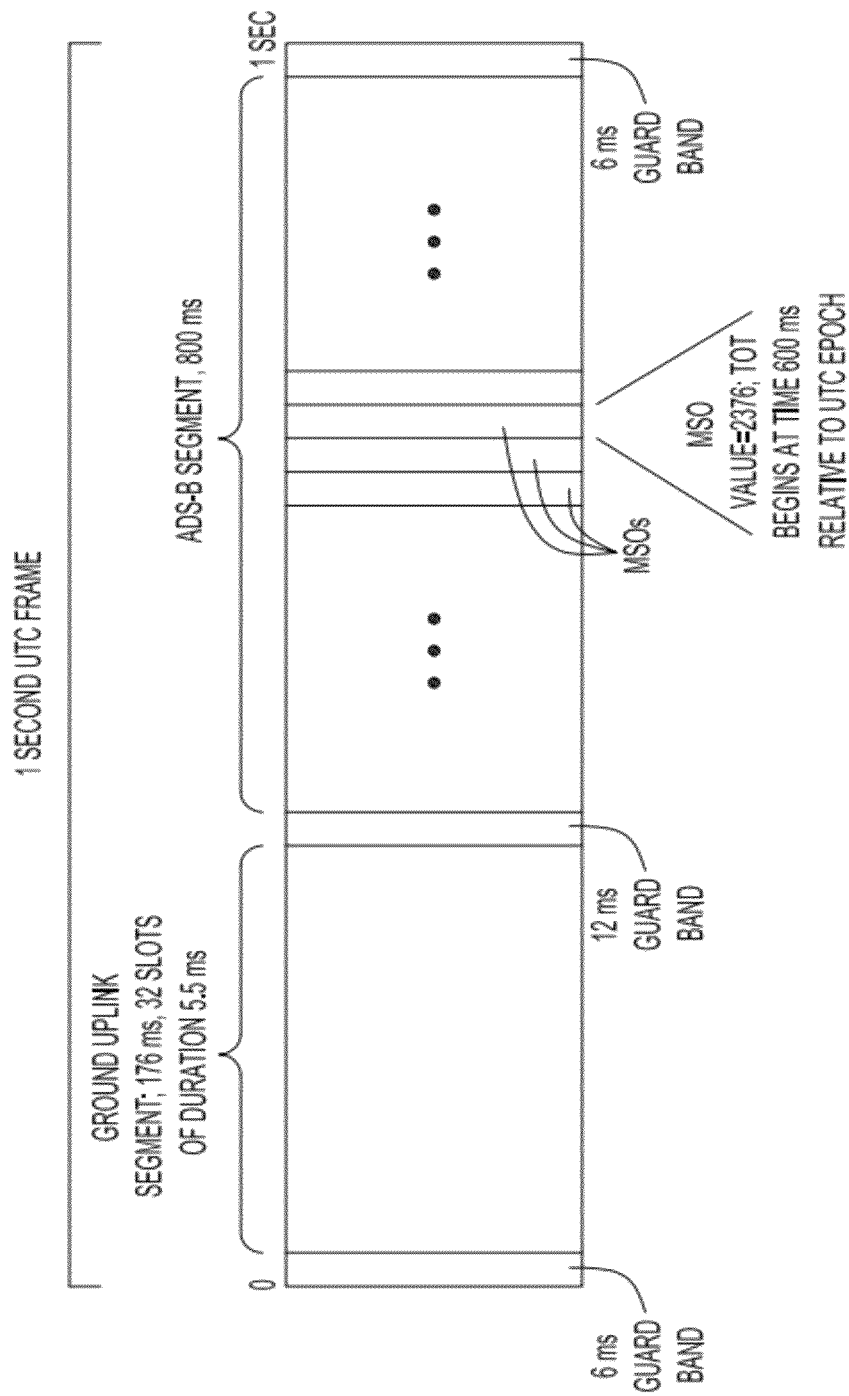
FIG. 6 is a diagram showing messages start opportunities for ADS-B messages within the context of a one-second UTC time frame.

As shown in FIG. 6, the UAT time division of a one-second UTC time frame begins with a 6 ms guard-band in which no transmission is permitted, followed by a 176 ms ground uplink segment. A 12 ms guard-band then separates the ground uplink segment from a 800 ms ADS-B time segment, followed by a final 6 ms guard-band at the end of the one-second UTC frame. FIS-B messages are transmitted by SBS ground stations during the uplink time segment, while the ADS-B time segment is used by the SBS ground stations to uplink TIS-B and ADS-R and by aircraft to broadcast ADS-B messages to other aircraft and to SBS ground stations. ADS-B equipped aircraft within a geographic region transmit randomly beginning at different MSOs within the 800 ms ADS-B segment. However, since the MSOs are fixed within a UTC second and encoded within the transmitted "long" UAT messages, the time of transmission can be determined absolutely upon reception from the encoded MSO value.

The 800 ms ADS-B segment is divided into 3200 MSO time instants, each having a spacing of 250 µs. Each MSO is encoded in "long" UAT messages (the six LSBs of the twelve bit MSO are encoded in the message, the 6 MSBs can be determined coarsely by the receiving subsystem), which indicates a specific timing relative to the beginning of the one second UTC time frame (i.e., the UTC epoch). For example, a MSO of "2376" corresponds to the MSO at 600 ms (2376× 0.25 ms+6 ms (initial guard band) after the UTC zero second time epoch that corresponds to the beginning of a frame (this example assumes that the first MSO value in the frame would be numbered "0").

As specified in RTCA DO-282B section 2.2.4, UAT ADS-B messages include a variety of information. For example, three fields respectively contain the latitude, longitude, and altitude of the transmitting aircraft. Further, under the UAT protocol, each ADS-B message includes a field containing the MSO value that applies to that message. Note that, from UTC period to UTC period, the MSO value of a particular aircraft will change. Nevertheless, the time of transmission of an individual ADS-B message can be determined relative to the UTC time epoch based on the MSO information contained in the ADS-B message.

Referring again to FIG. 5, in operation 510, upon reception of each of the messages, the mobile device determines the time of reception of the message. Techniques for accurately determining the time of arrival of a transmitted signal are well known, and any of a variety of techniques can be employed by the mobile device to determine the time of reception of each signal. In the example shown in FIG. 4, the ADS-B transceiver system 404 can determine the time of reception of the ADS-B messages arriving from the in-range aircraft.

In operation 520, the time of transmission (TOT) of each of the messages received at the mobile device can be determined from the MSO values contained within the messages themselves. In the case of ADS-B messages broadcast under the UAT protocol, the spacing of each MSO value in the ADS-B segment of the UTC time frame is known (i.e., 250 µs). Thus, the time of transmission relative to the beginning of the UTC time frame can be determined by multiplying the MSO value by the MSO spacing and accounting for the preceding guard band. Referring again to FIG. 4, upon reception of an ADS-B message, the ADS-B transceiver system 404 identifies the MSO value contained in a field of the message (e.g., MSO value=2376 in the example shown in FIG. 6), and supplies the MSO value to the SBS positioning system 402 for further processing. Since the MSO values are sequential, and each MSO has a known spacing, MSO value of 2376 begins 600 ms after the start of the time frame, as previously described. Thus, the SBS positioning system 402 can determine the time of transmission of the ADS-B message from the MSO value contained in the ADS-B message.

In operation 530, the mobile device determines its own position via multi-lateration based on the time of transmission and the time of reception of the messages as well as the positions of the mobile reference devices, which are reported to the mobile device in the received messages. In the example shown in FIG. 4, the positions of the broadcasting aircraft are supplied to the ADS-B transceiver 404 via the latitude, longitude, and altitude information encoded in the ADS-B messages, and this information is forwarded to the SBS positioning system 402. In the case of a receiving aircraft, the aircraft can reliably know its altitude from onboard equipment that measures atmospheric pressure.

Since the mobile reference devices (e.g., the transmitting ADS-B equipped aircraft) and the mobile device (e.g., the ADS-B transceiver system 404 and SBS positioning system 402) are synchronized to UTC time, the time of flight of the messages (e.g., the ADS-B messages) can be determined as the difference between the time of transmission and the time of reception. The range from each mobile reference device to the receiving mobile device can then be determined by multiplying the time of flight of the message signal by the speed of light. Note that the time of transmission can be determined with confidence solely from the MSO value contained in the crosslink message. Thus, the technique takes advantage of the time-segmented nature of the UAT broadcasting protocol to allow a receiving device to determine the time of transmission without actually receiving the time of transmission information in any message. Rather, the MSO value that is already provided in the standard UAT ADS-B message is sufficient to allow the receiver to determine the time of transmission accurately.

SBS positioning system 402 uses the received position information and the ranges or times of flight (signal propagation in air) to each transmitting aircraft determined from the times of transmission and reception to determine the navigation solution (i.e., the position of the platform) using multi-lateration. Typically, reception of broadcast signals from at least three or four transmitting mobile devices is required in a one-second time frame to develop an initial position solution.

In addition to computing an instantaneous position measurement from each set of ADS-B messages received, SBS positioning system 402 can track position over time by forming a state vector navigation solution using Kalman filtering or other filtering or tracking algorithms, in a manner similar to GPS receiver systems. The aforementioned quality/accuracy metrics of the navigation solution (NIC, NAC, and SIL) can also be computed per RTCA standards.

SBS positioning system 402 also receives a navigation solution from GPS receiver system 406 in the form of a state vector along with accuracy metrics. In the event the GPS data becomes temporarily unavailable, SBS positioning system 402 can substitute the ADS-B navigation solution for the GPS navigation solution, thereby providing a reliable backup source of navigation data within the ADS-B system.

Optionally, using the quality metrics, SBS positioning system 402 can compare the accuracy of the navigation solution determined from the ADS-B messages to the accuracy of the current GPS navigation solution and select the more accurate of the two navigation solutions for broadcast. SPS positioning system 402 then feeds the selected navigation solution back to the aircraft data bus to ADS-B transceiver system 404 to be broadcast via an ADS-B message, which can be received by SBS ground stations and other aircraft to maintain surveillance on the ground and in the air.

Thus, according to one implementation, SBS positioning system 402 can use the MSO value of a received ADS-B message to determine the time of transmission (TOT) of the ADS-B message relative to a time epoch (e.g., the elapsed time from the beginning of a one-second UTC time interval). The system can determine its range from a transmitting ADS-B equipped mobile platform based on the elapsed time between the time of reception and the TOT. Since the location of each transmitting ADS-B mobile platform is known, a receiver can determine its position via multi-lateration using the information available from ADS-B messages sent from a set of mobile platforms. Accordingly, assuming ADS-B messages can be received at a mobile platform (aircraft, ship, ground, etc.) equipped with a UAT receiver, the mobile platform can determine its position by making use of the MSO value and latitude, longitude, and altitude information present in the ADS-B messages received from a group of transmitting ADS-B equipped mobile platforms (e.g., aircraft). The UAT solution requires no changes to the ADS-B transmission equipment and takes advantage of information available from existing messages to determine the position of a mobile device.

While the foregoing implementation has been described in the context of the aircraft equipped with UAT avionics, it will be appreciated that the position determining technique can be used with any mobile device equipped to receive ADS-B messages, including ships, ground vehicles, and handheld or body-mounted devices. Moreover, while the described implementation involves a solution within the UAT protocol, the concept of using MSO values to convey the time of transmission can be employed in any time-slotted or time segmented protocol, thereby supporting analogous solutions within other signaling protocols.

The 1090ES protocol differs significantly from the UAT protocol in certain respects. 1090ES is not based on a time slot system with identifiable MSOs; consequently, ADS-B messages do not contain any information that would accurately indicate the transmit time. Thus, another signaling mechanism must be adopted to support a position determining scheme relying on air-to-air crosslink messages from airborne aircraft communicating with aircraft or other platforms using the 1090ES protocol.

Figure 7:
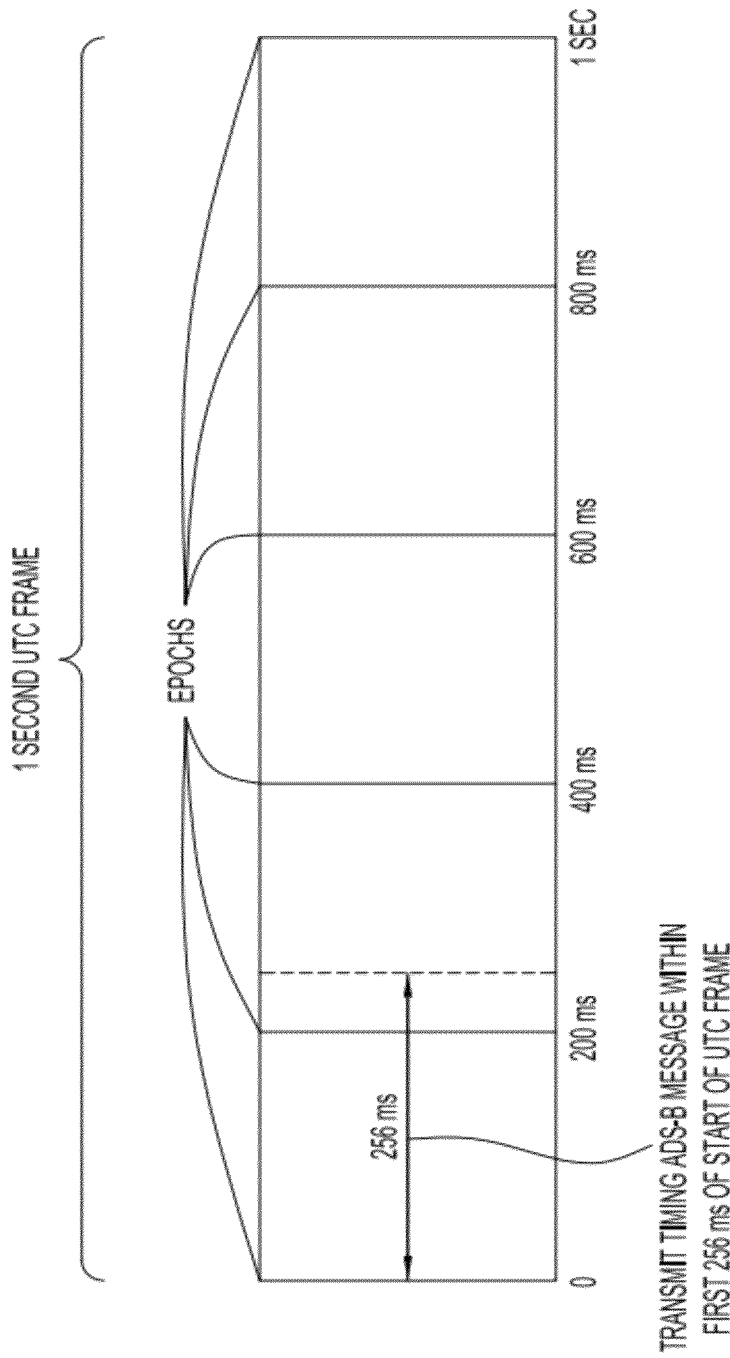
FIG. 7 is a diagram showing segmentation of a one-second UTC time frame within the 1090ES protocol.

For a UTC-synchronized 1090ES transmitter, the one-second UTC time frame is divided into 200 msec intervals, resulting in an identifiable time epoch every 200 ms, as shown in FIG. 7. These epochs are alternately assigned "odd" and "even" designations. Each of these epochs can serve as a time of applicability for information contained in an ADS-B message. For example, a conventional UTC-coupled 1090ES aircraft preparing a message is required to perform the various message population activities within a 100 ms time period in order to deliver the message to the transmitter in a timely manner. So that the aircraft position information to be transmitted in the message can be associated with an identifiable point in time, the aircraft avionics will extrapolate its own navigation solution (e.g., latitude, longitude) to the nearest 200 msec epoch to provide a meaningful time of applicability for the position information.

An aircraft or ground station receiving an ADS-B message can identify the time of applicability as the nearest 200 msec epoch based on the time an ADS-B message is received. Given that the time of flight of ADS-B message is less than 200 ms and the ADS-B message includes a bit that indicates whether the epoch used for the time of applicability was an "odd" or "even" epoch, there is no ambiguity at the receiver as to the correct epoch. Consequently, at the receiver end, the ADS-B message provides good position accuracy about the transmitter, since the message specifies both the transmitter position as well as the instant at which that position is applicable.

However, while the time of reception allows the receiver to determine the time of applicability associated with the information contained in an ADS-B message, it does not allow the receiver to determine the time of transmission of the ADS-B message. The 1090ES protocol involves randomizing the transmission times of messages in order to avoid frequent signal contention and to reduce conflicts among broadcasting devices, thereby introducing significant uncertainty in the time of transmission. As a result, with the 1090ES protocol, the time of transmission of an ADS-B message cannot be known at the receiver with sufficient accuracy to support ranging, position determination, or time synchronization. This transmission approach presents a challenge in reporting the time of transmission to the receiving device, which requires the time of transmission to compute time-of-flight/range and develop a navigation solution from received messages. Thus, some modification to the standard beacon ADS-B message scheme is required to support position determination.

One option for conveying the time of transmission of an ADS-B message to the receiving avionics in the 1090ES protocol is to encode the time of transmission into the ADS-B message itself in a follow-up message. This can be accomplished in a number of ways that are substantially transparent to the existing 1090ES scheme. The approach of encoding the time of transmission into the ADS-B message itself assumes that the time of transmission will be known at the time the message is generated, which is generally not the case with the present 1090ES protocol. Another option is to determine the time of transmission of a position message from the transmitter subsystem, in this case the transmitting mobile platform, and then supply the time of transmission to the receiving avionics in a subsequent message. Such a scheme can be implemented by using an aircraft ID and category (ACID) message, which is a particular type of message within the suite of messages of ADS-B in 1090ES.

Figures 8, 9:
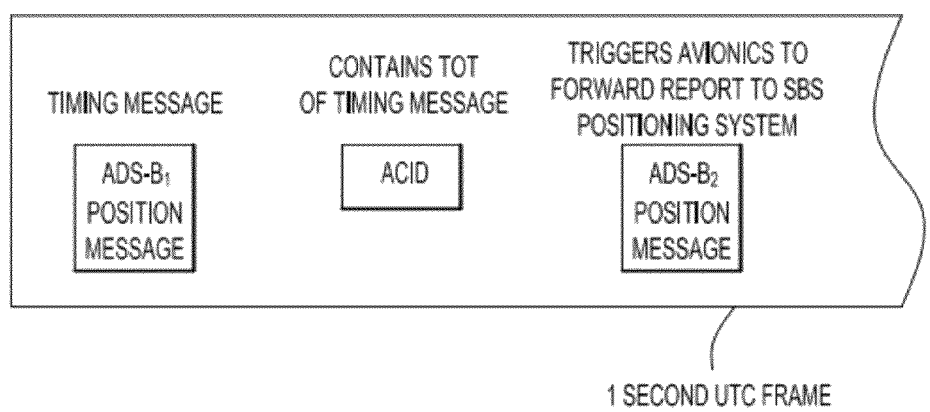
FIG. 8 is a diagram showing repurposing of an aircraft ID & category (ACID) message to convey time of transmission.
FIG. 9 is a timing diagram showing a sequence of messages for implementing position determining using ADS-B messages under the 1090ES protocol.

When used in the intended manner in air-to-air crosslink communications between aircraft, ACID messages are employed to maintain separation between aircraft. In the context of an ADS-B message used at the receiving end for position determination, an ACID message can be repurposed to convey the time of transmission of the preceding ADS-B message. As shown in FIG. 8 and specified in RTCA DO-260B section 2.2.3.2.5, the "ME" payload fields of an ACID message include an emitter category that consists of a type code and a subtype code, which together identify the type of emitter that is sending the message (e.g., large aircraft, small aircraft, beacon, etc.). In this case, these fields are filled to indicate that the emitter is sending an ADS-B message for use in position determination (i.e., an ADS-B position message). After the type and subtype fields, the ACID message structure contains 48 bits. In the more typical air-to-air context, these bits are used to convey eight characters encoded in an ASCII-like format. An aircraft would normally insert a flight ID here (e.g., "United Airlines 1531"), which can be used for separation and operations.

In the case of an ADS-B message supporting position determination, there is no need for a flight ID in an ACID message. Since the flight ID is relatively static, the ADS-B avionics can intermittently use this field to communicate the time of transmission. Specifically, the remaining 48 bits (8 characters) of the ACID message can be used to convey the time of transmission of the previously broadcast ADS-B message without violating the rules of the 1090ES protocol. To support accurate ranging, the time of transmission needs to be known to a resolution under 10 ns. Given the limited number of characters in the ACID message, the greater the resolution of the time of transmission, the shorter the time interval that can be represented by the characters. To be comparable to the UAT time-slotted solution previously described, a resolution of about 1 ns would be required.

Since the time interval that can be covered by the characters of the ACID message is limited, the encoded time of transmission can be specified relative to the beginning of the current one-second UTC frame. For example, a time of transmission of 242.435178 ms would mean the preceding ADS-B timing message was transmitted 242.435178 ms after the beginning of the current UTC frame. According to one option, the first two characters of the 8 character field of the ACID message can indicate the milliseconds of the time of transmission, the next three characters can indicate the microseconds of the time of transmission, and the last three characters can indicate the nanoseconds of the time of transmission.

According to another approach, the first character can be filled with a special character (e.g., a colon or semicolon character) that serves as a marker to indicate that the ACID message is a timing message and not a regular flight ID message and that the remaining bits are being used to encode the time of transmission in hexadecimal. Overall, this is a more efficient use of the 48 bits and allows up to 256 ms to be encoded with a precision of 1 ns (7 characters×16), which is sufficient to support ranging and position determination with an accuracy comparable to the UAT approach. As a result, the ADS-B timing message should be transmitted from the transmitting mobile platform within the first 256 ms of the beginning of the one-second UTC time frame in order for its time of transmission to be encoded in an ACID message with a 1 ns precision, as shown in FIG. 7. Alternatively, if a 4 ns resolution is acceptable, a full second can be represented in the ACID message, thereby removing the constraint of when the ADS-B timing message is transmitted relative to the start of the one-second UTC frame.

A number of options are available for mechanizing the 1090ES solution with existing ADS-B aircraft avionics. As shown in FIG. 9, according to one approach, a sequence of three messages can be broadcast by the transmitting mobile platform within a one-second UTC frame: the initial ADS-B position message; the ACID message containing the time of transmission of the initial ADS-B position message; and a second ADS-B position message that triggers the receiving aircraft avionics to generate a report that is received by the SBS positioning system. As previously described, to avoid ambiguity, the ADS-B messages contain a parity bit that indicates an even or odd epoch within the UTC time frame as the time of applicability. The first ADS-B position message is specified as an "even" parity message, and the second ADS-B position message (third message in the sequence) is specified as an "odd" parity message.

Current avionics generate an output report in response to receipt of ADS-B position messages. In this scheme, the initial ADS-B position message causes the ADS-B transceiver to generate a report that is supplied to the SBS positioning system. The subsequent ACID message supplies the time of transmission (TOT) of the initial ADS-B message to the ADS-B transceiver system, but does not cause the transceiver system to generate a report. The second ADS-B position message causes the ADS-B transceiver system to generate a second report, which is populated with the TOT received in the ACID message. The emitter category information from the ACID message is also inserted in the second report and allows the SBS positioning system to associate the second report with the first report (i.e., the report are identifiable as being from the same aircraft), thereby providing the necessary TOT of the initial ASD-B message to the SBS positioning system. In effect, this scheme allows the SBS transceiver system to send the necessary timing information to the SBS positioning system in a two-report sequence in a manner that is transparent to the existing ADS-B avionics and that does not require any hardware or software modification to the existing avionics. Of course, any of a variety of other mechanisms can be used, and future avionics can be implemented to simplify the reporting scheme for ADS-B position messages.

According to another option within the 1090ES protocol, one or more fields within the ADS-B message can be used to encode a slot ID or MSO value in a manner similar to the UAT approach described above. For example, a field within the ADS-B message can be used to encode a MSO value. However, for the MSO value to be useful to the receiving device, the time of transmission must be derivable from the MSO value, requiring the time of transmission to occur at a specific time with a certain degree of precision. Thus, this option requires that at least certain messages within the 1090ES protocol be transmitted without randomizing the time of transmission, which may require hardware or firmware changes in 1090ES equipment.

Figure 10:
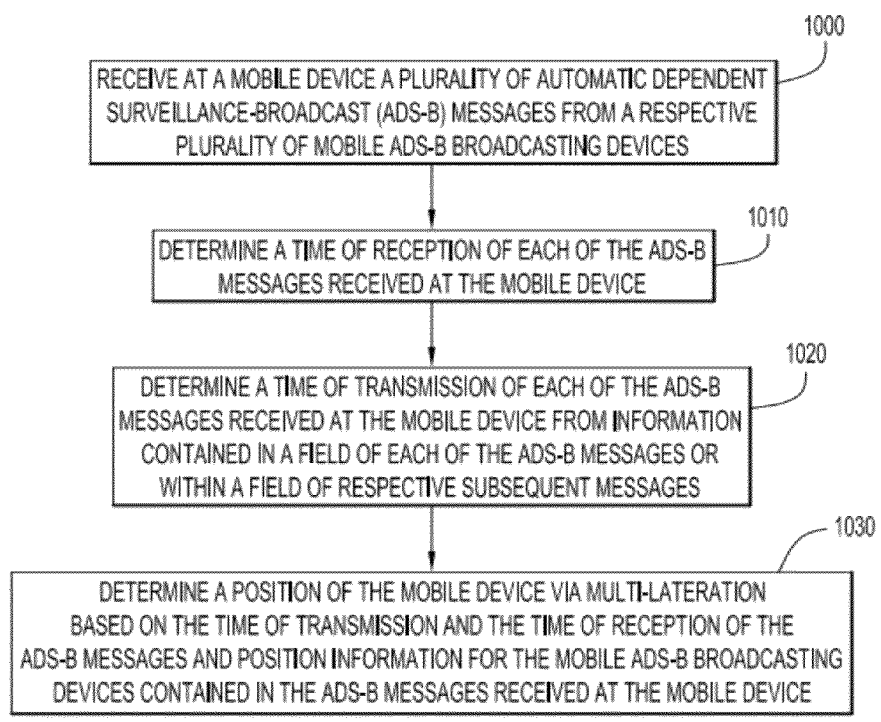
FIG. 10 is a functional flow diagram summarizing operations performed by a mobile device to determine its position from ADS-B messages broadcast by mobile ADS-B broadcasting devices.

FIG. 10 summarizes the operations involved in determining the position of a mobile device from ADS-B messages broadcast from mobile platforms such as aircraft. In operation 1000, the mobile device receives a plurality of ADS-B messages from a respective plurality of mobile ADS-B broadcasting devices. The mobile device determines the time of reception of each of the received ADS-B messages in operation 1010. In operation 1020, the mobile device determines the time of transmission of each of the received ADS-B messages from information contained in a field of each of the ADS-B messages or within a field of respective subsequent messages (e.g., the time of transmission relative to a UTC epoch is encoded into a subsequent ACID message). The mobile device determines its position in operation 1030 via multi-lateration based on the time of transmission and the time of reception of the ADS-B messages and position information for the mobile ADS-B broadcasting devices contained in the ADS-B messages received at the mobile device. In particular, the SBS positioning system can employ essentially the same mechanism described above in the example involving the UAT protocol to determine a navigation solution and then use the navigation solution as a backup for the GPS navigation solution or use the more accurate of the two navigation solutions based on a comparison of the accuracy metrics.

Like GPS signals, the signals broadcast by ADS-B-equipped mobile platforms to support position determination described herein can also be used to synchronize the timing of a receiver's clock to the timing of a reference device. For this purpose, the receiving device can be either a mobile device (e.g., airborne, maritime, or ground-based platform) or a stationary installation (e.g., a receiver mounted on a building). For time synchronization, the receiver requires a timing message from only a single ADS-B broadcasting source, since multi-lateration is not necessary. For example, in the UAT protocol implementation employing the MSO value to convey time of transmission information, an ADS-B message from a single aircraft can be used to synchronize the clock of a UAT receiver with that of the aircraft Likewise, under the 1090ES protocol, reception of the ADS-B message sequence is required from only one aircraft to permit time synchronization.

Figure 11:
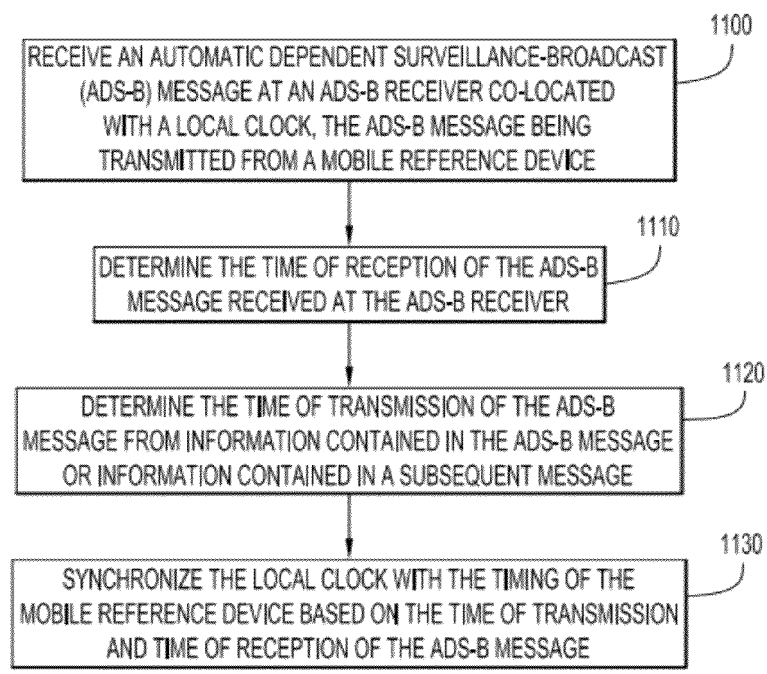
FIG. 11 is a functional flow diagram summarizing operations performed by a receiver device to synchronize a local clock with a mobile ADS-B broadcasting device serving as a mobile reference device.

The flow diagram of FIG. 11 summarizes operations for synchronizing a local clock. In operation 1100, an ADS-B receiver co-located with a local clock receives an ADS-B message transmitted from a mobile ADS-B broadcasting device. The time of reception of the ADS-B message received at the ADS-B receiver is determined in operation 1110, and in operation 1120, the time of transmission of the ADS-B message is determined from information contained in the ADS-B message or information contained in a subsequent message (e.g., using a MSO value or the time of transmission encoded into a message as previously described). In operation 1130, the local clock is time synchronized with the timing of the mobile ADS-B broadcasting device based on the time of transmission and time of reception of the ADS-B message. More specifically, a timing error between the timing of the local clock (e.g., a time of day value) and the timing of the clock of the mobile ADS-B broadcasting device can be computed by determining a timing offset that includes the time of flight of the broadcast ADS-B message and any known or estimated processing delays. The timing error can be computed from the difference between this timing offset and the actual time difference between the local and reference clock. Once the timing error is determined, the timing of the local clock can be adjusted by the timing error so that the timing of the local clock is the same as that of the mobile ADS-B broadcasting device.

This time synchronization mechanism can be particularly useful where GPS is temporarily or intermittently unavailable for time synchronization. Without GPS, typical clocks will drift out of synchronization within about an hour. This can be avoided with very high accuracy cesium clocks; however, widespread use of such clocks would be cost prohibitive (e.g., a cesium clock server presently costs about $30,000 US). The described time synchronization scheme effectively allows mobile ADS-B broadcasting devices (e.g., aircraft) to disseminate an accurate time reference by equipping platforms with an ADS-B compatible receiver at a fraction of the cost (e.g., a UAT receiver system presently costs about $5,000 US).

In addition to mobile devices, a variety of stationary platforms can benefit from the time synchronization capability provided by messages broadcast by mobile ADS-B broadcasting devices. For example, a building housing a financial institution (e.g., stock exchange, brokerage, bank, etc.) can be equipped with a UAT receiver capable of receiving messages from at least one mobile ADS-B broadcasting device to allow the local timing reference to maintain synchronization with UTC time for accurate time stamping or tagging of financial transactions. This can be used either as a backup to GPS or as a primary reference source. Cellular telephone towers can also use ADS-B broadcast signals as a primary or secondary reference source for maintaining UTC time synchronization.

The techniques described herein may be particularly beneficial where a receiver does not have access to signals from terrestrial ground stations. For example, in a maritime context, a ship at sea may not be able to receive position determining signals from ground stations, but nevertheless can receive signals from in-range overhead aircraft. Thus, an effective complement or backup to GPS can be provided over a wide area where ground-based signals are not available.

In the foregoing specification, embodiments of the invention have been described with reference to specific example embodiments thereof. It will be evident that various modifications may be made thereto without departing from the broader spirit and scope of the invention as set forth in the following claims. Although specific terms are employed herein, they are used in a generic and descriptive sense only and not for purposes of limitation.

What is claimed is:

1. A method of determining the position of a mobile device, comprising:
    receiving at the mobile device a plurality of Automatic Dependent Surveillance-Broadcast (ADS-B) messages from a respective plurality of mobile reference devices, each of the ADS-B messages being broadcast beginning at one of a plurality of ADS-B message start opportunity (MSO) times having known timings relative to a reference time, wherein each of the ADS-B messages contains position information for the mobile reference device transmitting the message and a MSO value indicating the MSO time at which transmission of the message started;
    determining a time of reception of each of the ADS-B messages received at the mobile device;
    using the MSO value to determine the time of transmission of each of the ADS-B messages received at the mobile device; and
    determining a position of the mobile device via multilateration based on the time of transmission and the time of reception of the ADS-B messages and the position information for the mobile reference devices.

2. The method claim 1, wherein the ADS-B messages are received from respective airborne aircraft.

3. The method of claim 1, wherein the position information in each of the ADS-B messages includes latitude, longitude, and altitude information for an ADS-B equipped mobile platform transmitting the ADS-B message.

4. The method of claim 1, further comprising:
    broadcasting from the mobile device the position of the mobile device determined from the ADS-B messages.

5. The method of claim 1, wherein the time of transmission is determined relative to a Coordinated Universal Time (UTC) epoch.

6. An apparatus, comprising:
    a mobile platform at which a plurality of Automatic Dependent Surveillance-Broadcast (ADS-B) messages is received from a respective plurality of mobile reference devices, each of the ADS-B messages being broadcast beginning at one of a plurality of message start opportunity (MSO) times having known timings relative to a reference time, wherein each of the ADS-B messages contains position information for the mobile reference device transmitting the ADS-B message and a MSO value indicating the MSO time at which transmission of the ADS-B message started; and
    a processor disposed on the mobile platform and configured to:
    determine a time of transmission of each of the ADS-B messages received at the mobile platform, the time of transmission being determined from the MSO value; and
    determine a position of the mobile platform via multilateration based on the time of transmission and a time of reception of each of the ADS-B messages and the position information for the mobile reference devices.

7. The apparatus of claim 6, wherein the processor is configured to determine the time of transmission of each of a plurality of ADS-B messages received from respective airborne aircraft.

8. The apparatus of claim 6, wherein the processor is configured to:
    determine the time of transmission of each of the ADS-B messages received from respective ADS-B equipped mobile platforms.

9. The apparatus of claim 6, wherein the processor is further configured to supply the position of the mobile device to a transmitter system for broadcast.

10. The apparatus of claim 6, wherein the processor is configured to determine the time of transmission relative to a Coordinated Universal Time (UTC) epoch.

11. One or more non-transitory computer readable storage media encoded with software comprising computer executable instructions and, when the software is executed, operable to:
   determine a time of transmission of each of a plurality of Automatic Dependent Surveillance-Broadcast (ADS-B) messages received at a mobile platform from a respective plurality of mobile reference devices, each of the ADS-B messages being broadcast beginning at one of a plurality of message start opportunity (MSO) times having known timings relative to a reference time, wherein each of the ADS-B messages contains position information for the mobile reference device transmitting the message and a MSO value indicating the MSO time at which transmission of the message started; and
   determine a position of the mobile platform via multilateration based on the time of transmission and a time of reception of each of the ADS-B messages and the position information for the mobile reference devices.

12. The non-transitory computer readable storage media of claim 11, wherein the instructions that are operable to determine the time of transmission comprise instructions that are operable to determine the time of transmission of the ADS-B messages received from respective airborne aircraft.

13. The non-transitory computer readable storage media of claim 11, wherein:
   the instructions that are operable to determine the time of transmission comprise instructions that are operable to determine the time of transmission of each of the ADS-B messages received from respective ADS-B equipped mobile platforms.

14. The non-transitory computer readable storage media of claim 11, further comprising instructions operable to supply the position of the mobile device to a transmitter system for broadcast.

15. The non-transitory computer readable storage media of claim 11, wherein the instructions that are operable to determine the time of transmission comprise instructions that are operable to determine the time of transmission relative to a Coordinated Universal Time (UTC) epoch.

16. A method of determining the position of a mobile device, comprising:
   receiving at the mobile device a plurality of Automatic Dependent Surveillance-Broadcast (ADS-B) messages from a respective plurality of mobile ADS-B broadcasting devices;
   determining a time of reception of each of the ADS-B messages received at the mobile device;
   determining a time of transmission of each of the ADS-B messages received at the mobile device from information contained in a field of each of the ADS-B messages or within a field of respective subsequent messages; and
   determining a position of the mobile device via multilateration based on the time of transmission and the time of reception of the ADS-B messages and position information for the mobile ADS-B broadcasting devices contained in the ADS-B messages received at the mobile device.

17. The method of claim 16, wherein the ADS-B messages are transmitted from airborne aircraft.

18. The method of claim 16, further comprising:
   receiving the time of transmission of each of the ADS-B messages via the respective subsequent messages, wherein the respective subsequent messages comprise aircraft ID & category (ACID) messages reconfigured to contain the time of transmission of the respective ADS-B messages.

19. The method of claim 16, further comprising:
   broadcasting from the mobile device the position of the mobile device determined from the ADS-B messages.

20. The method of claim 16, wherein the time of transmission of each of the ADS-B messages received at the mobile device is randomized.

\* \* \* \* \*